July 9, 1940.  F. L. McGARY  2,207,223
BENCH SHEAR
Filed Aug. 30, 1937
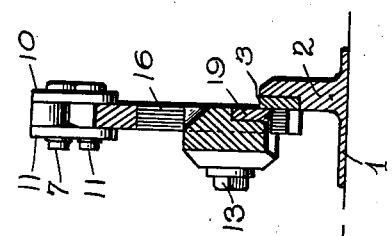
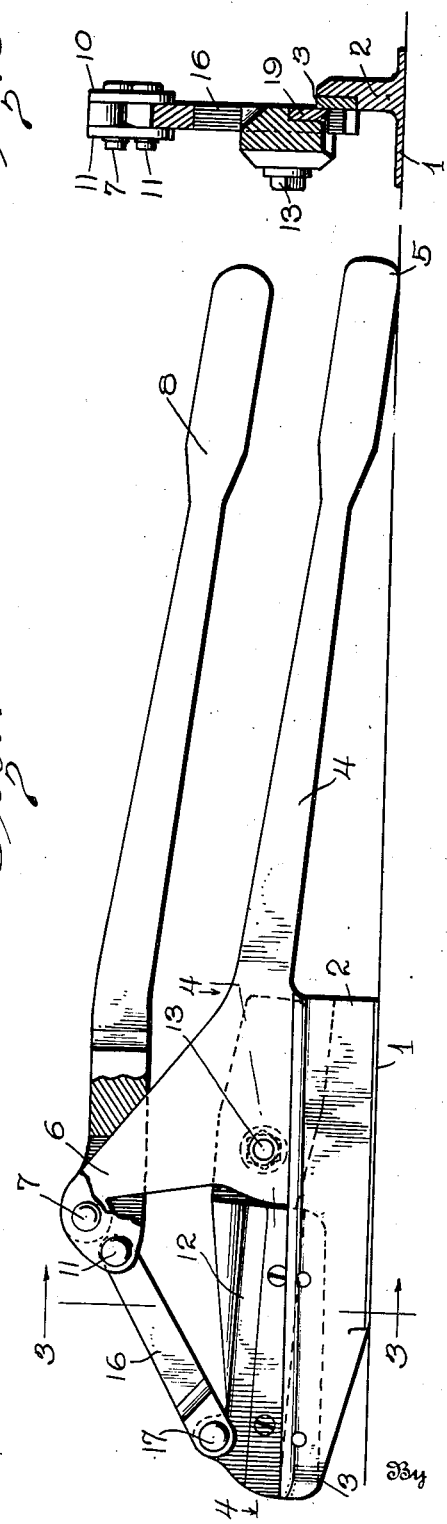
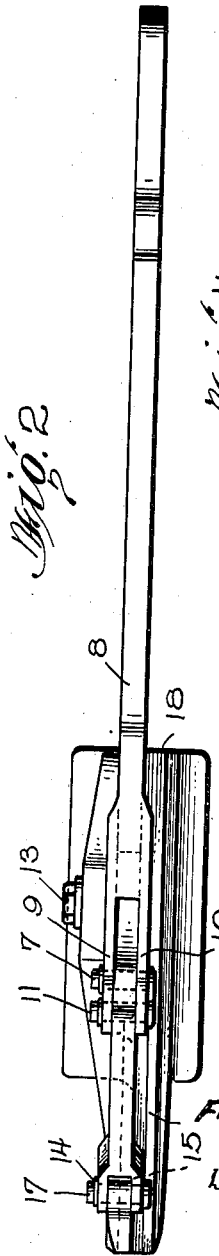
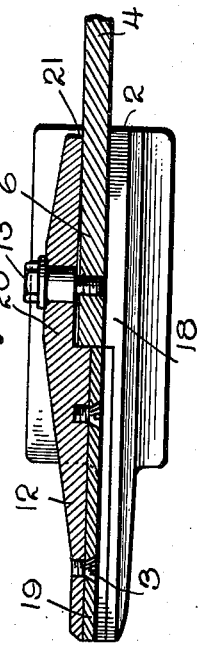
Inventor
Francis L. McGary
Dahm + Taylor
Attorney Patented July 9, 1940

2,207,223

UNITED STATES PATENT OFFICE 2,207,223

BENCH SHEAR

Francis L. McGary, Hardinsburg, Ky.

Application August 30, 1937, Serial No. 161,671

9 Claims. (Cl. 30—250)

This invention relates to metal cutting shears of the bench type, designed more particularly for cutting sheet metal, metal bands, hoops, and other sheet metal structures of similar character.

The particular construction of the device shown in the drawing is designed to be placed upon a work bench and has a substantial base for supporting surfaces and is provided with two handles, the lower of which will make contact with the upper surface of the bench to stabilize the device while the upper handle is manipulated to operate the cutting jaws.

The device as shown comprises a base support having integral therewith one of the cutting jaws and also the handle which remains stationary in the normal operation of the device when placed on the bench. The upper or cutting blade is operated through a simple and effective toggle connection from the upper handle.

Among the features of importance of this invention is the arrangement of the movable cutting jaw with respect to its pivotal point of support so that the two jaws may be relatively adjusted to compensate for wear of the cutting edges of the tool by a simple operation.

Another feature of the invention relates to the provision of a flange adjacent the upper edge of the lower cutting jaw which extends throughout the length of the cutting blade and beyond the pivot point of the two jaws to act as a support for the work when the jaws are opened for the purpose of advancing the material to be cut for the next cutting operation.

A particular feature of the invention resides in the provision of a handle attached to the lower jaw which extends outwardly and downwardly until its end engages the plane of the base support of the tool so that when the tool is placed upon a table or bench it will be supported by its base; also by the end of the lower handle, which handle end operates as a fulcrum in the manipulation of the upper handle during a cutting operation and maintains the tool in its stationary position.

In the drawing:

Figure 1 is a side elevation of the tool of this invention with a part of the upper handle cut away;

Figure 2 is a plan view of the device shown in Figure 1;

Figure 3 is a section on the line 3—3 of Figure 1; and

Figure 4 is a section on the line 4—4 of Figure 1.

In Figure 1 of the drawing the tool is shown as provided with a substantially rectangular base portion 1 designed to rest upon the bench or the plane surface, which base is provided with a vertically disposed portion 2 having inserted therein at the left side of the figure a cutting blade 3, outlined in dotted lines. Integral with the upright portion 2 is the handle 4 extending to the right of the figure until its extreme end engages at 5 with the plane of the base 1. The portion 2 has an upwardly extending portion 6 provided with an opening in which is inserted a pivot pin 7 upon which the upper or operating handle 8 is pivoted.

It will be seen from Figures 1 and 2 that the handle 8 is bifurcated at its pivoted end and that the two sides 9 and 10 at the bifurcated end enclose the upper end portion of the extension 6 and are supported thereby by means of the pivot pin 7 previously referred to. The end portions 9 and 10 of the handle 8 are also provided with openings below and to the left of the pivot pin 7 for the reception of a pivot pin 11.

The movable or cutting jaw 12 of the tool is pivoted at 13 to the upright portion 2 and has at its outer end an extension which is enclosed by the forked end portions 14 and 15 of a toggle link 16 and pivoted thereto by a pivot pin 17. From the construction just described, it will be apparent that when the upper handle 8 is raised, the pivot 11 will move downwardly and to the right around the pivot pin 7, which movement will, through the link 16 raise the pivot 17 and lift the outer end of jaw 12 which is pivoted at 13, thereby opening the jaws of the tool. Downward pressure on the handle 8 will cause a reverse movement of the parts just described and produce a powerful leverage between the handle 8 and the cutting jaw 12 through the toggle mechanism described, to provide a very effective cutting operation.

It will also be apparent from a consideration of Figure 1 that the handle 4 performs a useful function during the cutting operation of the device since it extends into engagement with the top of the bench on which the tool is placed and serves as a fulcrum point when the tool is operated.

Referring more particularly to Figure 4, this figure shows the flange 18 for supporting the work as it passes to the right beyond the stationary blade 3. This figure also shows the extension 6 of the upright portion 2 in section and shows that the hand portion 4 is in alignment with the extension 6 and that this part of the structure is offset from the flange 18. In this figure also the cutting jaw 12 is shown in section and having an inserted cutting blade 19 attached thereto by screws or in any suitable manner. The jaw 12 has an offset portion 20 extending to the right and through which the pivot pin 13 is inserted. The offset portion 20 of the blade 12 extends considerably to the right of the pivot 13 and engages the face of the handle 4 as indicated at 21. It will be noted that at the pivot point the offset 20 is spaced away from the extension 6 which spacing is for the purpose of providing a construction which will admit of adjustment of the two cutting jaws when they have become worn through extended use. If, due to unusual wear, it becomes necessary to move the jaws into closer engagement, the pivot 13 is tightened and by the reason of the spacing of the parts 20 and 6 and the engagement of the offset 20 with the handle 4 as indicated at 21, the blades will be forced together. The extension of the part 20 as indicated at 21 will form a fulcrum which will cause the blades to draw together when the pivot is tightened.

From the above description it will be apparent that a bench tool has been devised which is very efficient in operation due to the fact that the handle 5 extends into engagement with the plane of the bench to serve as a stabilizing fulcrum for the tool when in operation. Also, due to the toggle mechanism described, a very powerful cutting force can be applied with comparatively small force exerted upon the long operating handle 8. In addition to the above features, the spacing of the offset portion of the cutting blade and its extension provide a fulcrum for adjusting the blades. In addition to the above features the provision of the flange 18 provides a support for the work as it is advanced for repeated operation of the cutting blades.

It will be obvious to those skilled in the art that many variations may be made in the device of my invention as herein disclosed, all without departing from the spirit of the invention; therefore I do not limit myself to what is shown in the drawing and described in the specification but only as required by the state of the prior art.

Having thus fully described my invention, what I claim is:

1. A bench shear comprising a flat bottomed body, fixed and pivoted jaws on said body, a handle pivoted to said body adjacent the pivot of said movable jaw, said handle having an arm extending forward from the pivot of the handle and a toggle link pivotally connected to said pivoted jaw near its free end, said link being jointed to said pivoted handle at a point which is below a plane passing through the axis of said handle and the axis between said link and said pivoted jaw, said link being approximately in line with the forwardly extending arm of the handle when the shear is closed.

2. A bench shear comprising a front portion having a flat bottom for resting on a bench, an upwardly projecting fin thereon, a handle integral with said fin and said front portion, said handle being constructed so that its free end may rest on a bench that supports the shear, a fixed blade on said front portion, a movable blade having an offset portion pivoted to said fin, a handle pivoted to said fin forwardly of the pivot of said movable blade, and a link pivoted to the front end of said movable blade and pivoted to said movable handle at a point below a plane passing through the pivot of the movable handle and the pivot connecting said link and movable jaw.

3. A shear comprising a handle having a fixed jaw, a pivoted jaw thereon, a movable handle pivoted to said fixed handle above the pivot of said jaw, a link pivoted directly to the pivoted jaw adjacent its free end and pivoted directly to the free forward end of said pivoted handle at a point below a plane passing through the other pivot of the link and the pivot of said handle the pivots at the ends of the link moving toward a position where they lie approximately in a common plane with the pivot of the second named handle as the shear is being closed.

4. A pair of shears comprising a handle having a jaw fixed thereto, a jaw pivoted to said handle, a second handle pivoted to the first at a substantial distance from the pivot point of said pivoted jaw and above the same, said second handle extending forward from its pivot, and a single link connecting the forward end of said second handle to said pivoted jaw near its front end, the pivot of said second handle and both pivots of the link closely approaching a common plane as the shear is being closed.

5. A bench shear comprising a handle having a blade fixed thereto said handle having a flat bottomed enlargement at one end for supporting the shear on a bench and having its free end inclined downward to rest on such a bench, a jaw pivoted to said handle, a second handle pivoted to the first, and a link attached to the forward end of said pivoted jaw and to the forward end of said second handle forwardly of said pivot, the pivot of said second handle and both of the pivots of said link moving toward a position where they lie approximately in the same plane as the shear is being closed.

6. A pair of shears comprising a handle having a jaw fixed thereto, a jaw pivoted to said handle, a second handle pivoted to the first at a substantial distance from the pivot point of said pivoted jaw and above the same, said handle extending forward from its pivot, and a single link connecting the forward end of said second handle to said pivoted jaw near its front end, said link approaching alinement with said second handle as the shear closes.

7. A pair of shears comprising a handle having a jaw fixed thereto, a jaw pivoted to said handle, a second handle pivoted to the first and movable toward it to close the shear, and a link attached to said pivoted blade and to the forward end of said pivoted handle forwardly of its pivot.

8. In a shear, a handle having a jaw fixed thereto, a second jaw pivoted to said handle adjacent the rear end of said first-named jaw, a second handle fulcrumed on the first approximately directly above the pivot of said second jaw, said second handle extending forward from its pivot, and a link pivoted to the front ends of said handle and said second jaw, the pivots of said link and the fulcrum of said second handle being approximately in the same plane when the shear is closed.

9. In a shear, a handle having a jaw fixed thereto, a second jaw pivoted to said handle adjacent the rear end of said first-named jaw, a second handle fulcrumed on the first handle approximately directly above the pivot of said second jaw, said second handle extending forward from its pivot, and a link pivoted to the front ends of said handle and said second jaw, the pivots of said link approaching a common plane with said fulcrum as the shear is closed.

FRANCIS L. McGARY.